United States Patent
Goldband et al.

US006434532B2

(10) Patent No.: US 6,434,532 B2
(45) Date of Patent: *Aug. 13, 2002

(54) INTERACTIVE CUSTOMER SUPPORT FOR COMPUTER PROGRAMS USING NETWORK CONNECTION OF USER MACHINE

(75) Inventors: Steve Goldband, Palo Alto; Ron van Os, Sunnyvale; Jeffrey Barth, Stanford, all of CA (US)

(73) Assignee: Aladdin Knowledge Systems, Ltd., Tel Aviv (IL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/041,315

(22) Filed: Mar. 12, 1998

(51) Int. Cl.[7] .............................. G06F 17/60

(52) U.S. Cl. ....................................... 705/7

(58) Field of Search .............. 705/1, 7, 26, 28; 395/200, 21, 200.5, 200.53, 200.3, 703, 712, 200.31; 707/203, 8; 380/23

(56) References Cited

U.S. PATENT DOCUMENTS

| | | | |
|---|---|---|---|
| 5,367,635 A | * 11/1994 | Bauer et al. | 709/221 |
| 5,406,269 A | 4/1995 | Baran | 340/825.17 |
| 5,432,940 A | 7/1995 | Potts et al. | 395/700 |

(List continued on next page.)

FOREIGN PATENT DOCUMENTS

| | | | |
|---|---|---|---|
| EP | 0 841 616 | * | 5/1998 |
| EP | 0 878 760 | * | 11/1998 |
| EP | 0 905 615 | * | 3/1999 |
| WO | WO/97/07656 | | 3/1997 |

OTHER PUBLICATIONS

"D&B Software Makes Available First Complete Client/Server Application Over The Internet;" Business Wire; p3251039; Mar. 25, 1996.*

"Apple USA expands online customer support beginning with Eworld for MacIntosh;" PR Newswire; pN/A; Jul. 28, 1994.*

Primary Examiner—Wynn Coggins
Assistant Examiner—Forest Thompson
(74) Attorney, Agent, or Firm—Burns, Doane, Swecker & Mathis L.L.P.

(57) ABSTRACT

Broad-based, systematic, individualized, interactive customer software support is provided through a two-way, voluntary automated exchange of information between a software agent installed on a customer's machine and a server machine via a wide area computer network, e.g., the Internet. Communication between the agent and the server is optimized to be unobtrusive or transparent, e.g. using spare bandwidth of intermittent Internet connections. The agent is software non-specific and may be instructed to operate with respect to any arbitrary software program, and may further be instructed at various different times to operate with respect to various different software programs, including multiple different software programs on a single machine. The agent, with the user's informed consent, gathers activity information about the operations of the software program(s) and uploads this information to a particular server machine within a distributed server machine architecture, where it is stored in a database on a per-software-copy basis. A rules engine may cause instructions carrying a message targeted specifically toward the customer to be downloaded to the agent. Based on these instructions, the agent may take any of various actions, such as present a survey, present an advertisement, send an upgrade notice, present a limited-time offer, deliver individualized marketing messages, offer goods for sale and fulfill the commercial transaction, install an upgrade or bug fix for either an application or the agent itself, etc. Message presentation to the customer may be timed (e.g., delayed from the time of download) to achieve maximum impact.

30 Claims, 8 Drawing Sheets

U.S. PATENT DOCUMENTS

| | | | | |
|---|---|---|---|---|
| 5,655,081 A | * | 8/1997 | Bonnell et al. | 709/202 |
| 5,694,546 A | * | 12/1997 | Reisman | 705/26 |
| 5,732,275 A | * | 3/1998 | Kullick et al. | 395/712 |
| 5,764,992 A | * | 6/1998 | Kullick et al. | 395/712 |
| 5,768,382 A | * | 6/1998 | Schneier et al. | 380/23 |
| 5,774,656 A | * | 6/1998 | Hattori et al. | 709/223 |
| 5,809,251 A | * | 9/1998 | May et al. | 395/200.53 |
| 5,832,483 A | * | 11/1998 | Barker | 707/8 |
| 5,845,077 A | * | 12/1998 | Fawcett | 395/200.51 |
| 5,848,143 A | * | 12/1998 | Andrews et al. | 379/219 |
| 5,859,969 A | * | 1/1999 | Oki et al. | 395/200.3 |
| 5,862,325 A | * | 1/1999 | Reed et al. | 395/200.31 |
| 5,867,714 A | * | 2/1999 | Todd et al. | 395/712 |
| 5,870,610 A | * | 2/1999 | Beyda | 395/712 |
| 5,913,040 A | * | 6/1999 | Rakavy et al. | 395/200.62 |
| 5,931,907 A | * | 8/1999 | Davies et al. | 709/218 |
| 6,178,449 B1 | * | 1/2001 | Forman et al. | 709/224 |

\* cited by examiner

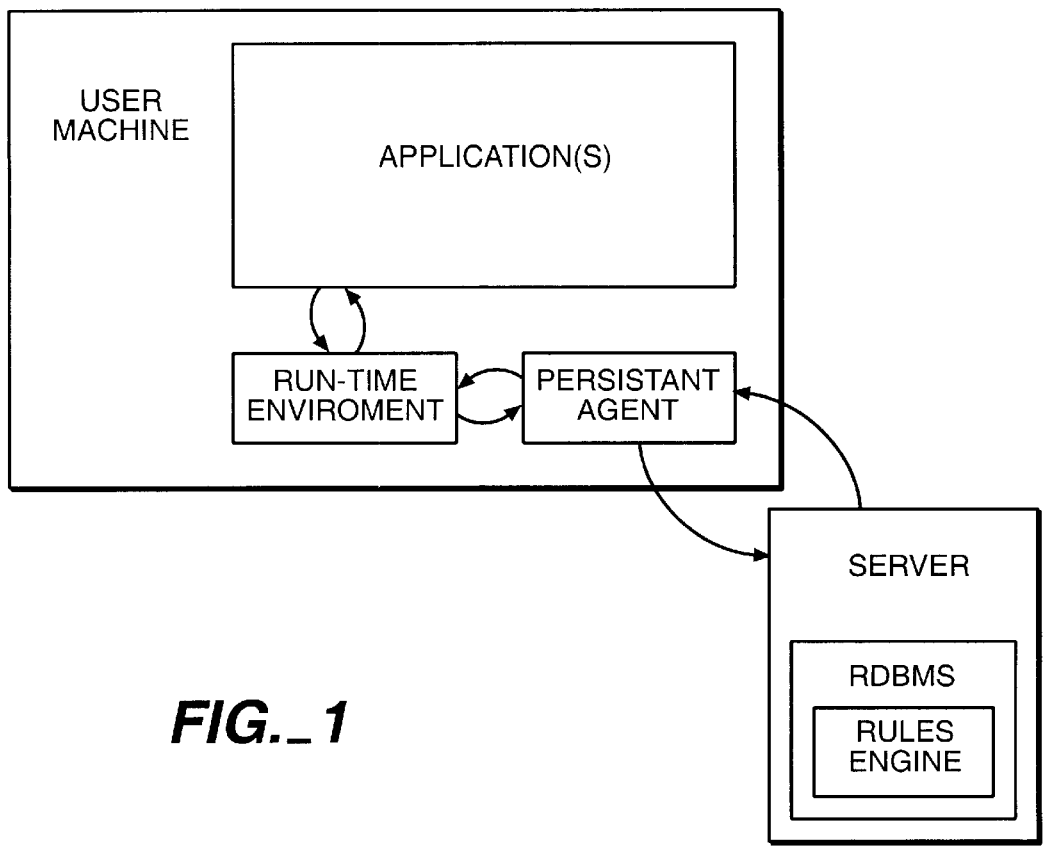
FIG._1
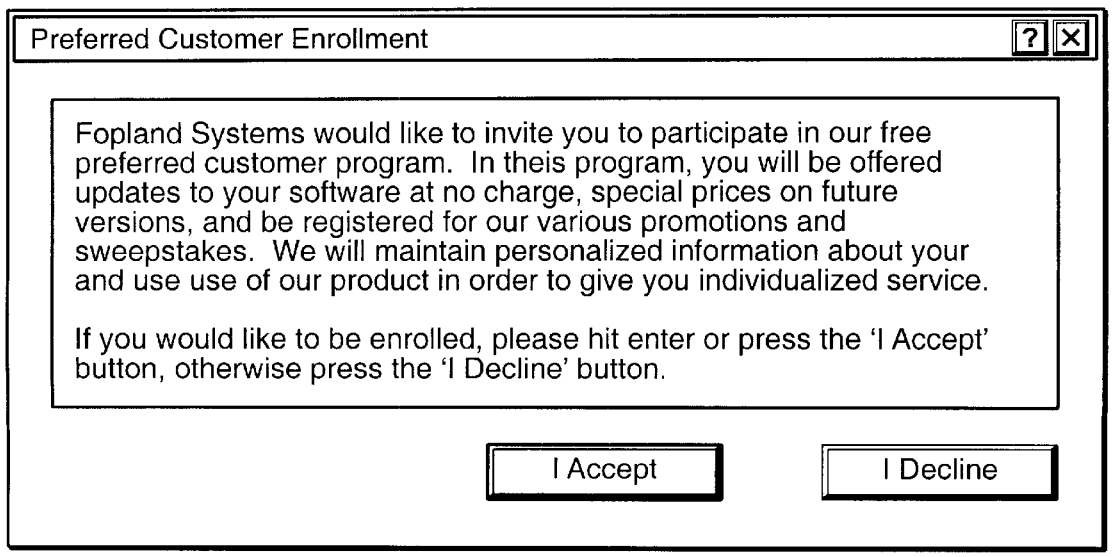
FIG._2

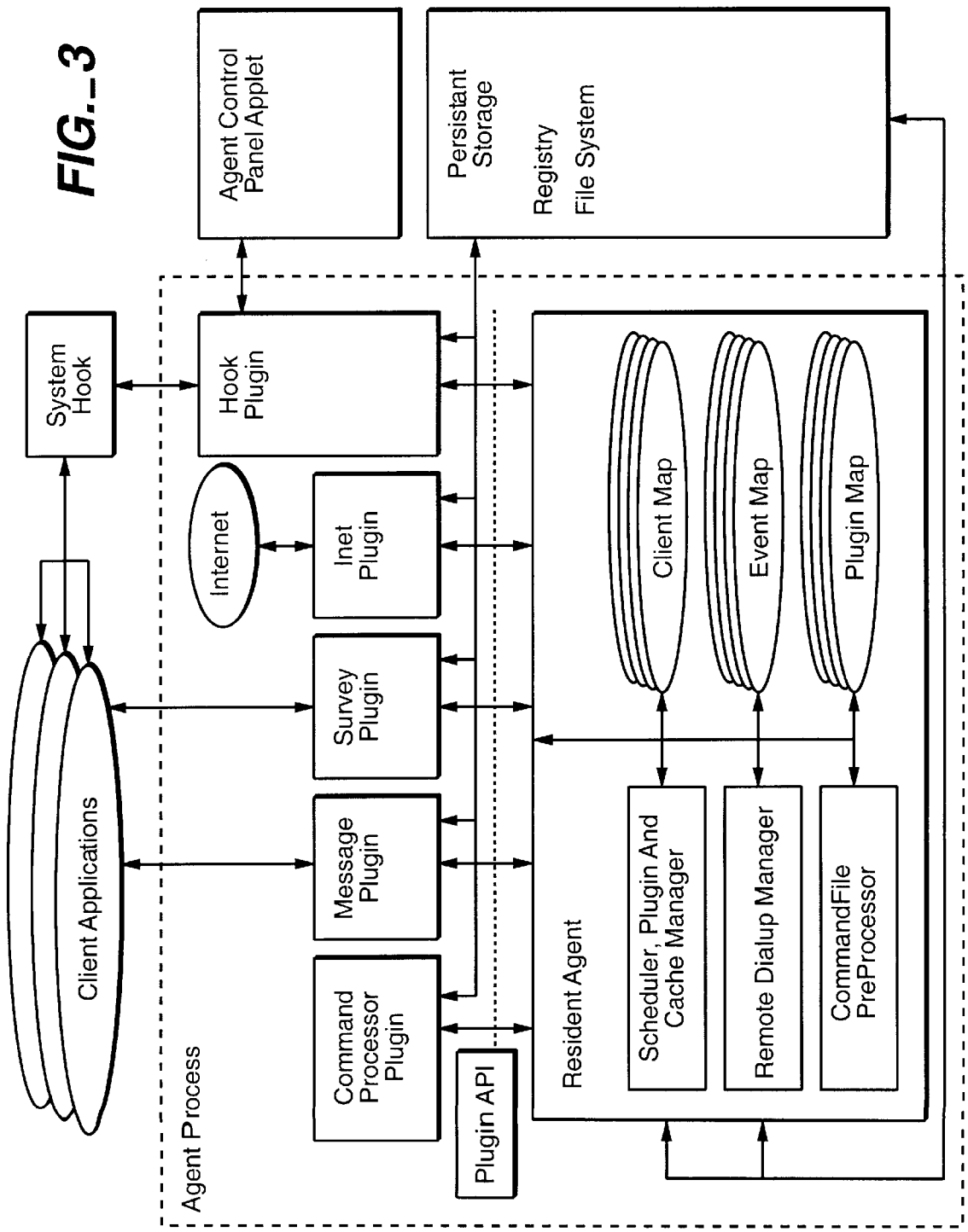
FIG._3

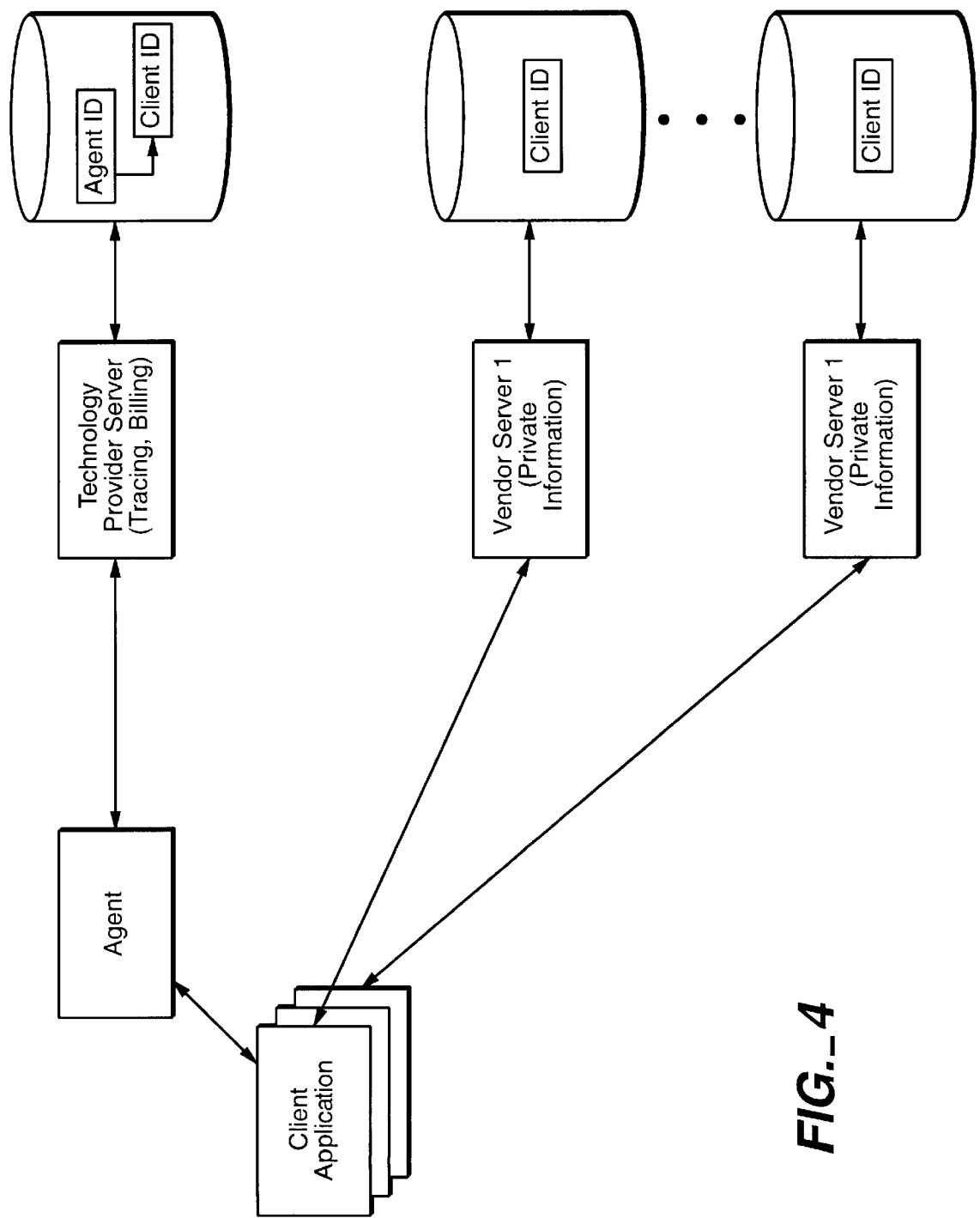
FIG._4

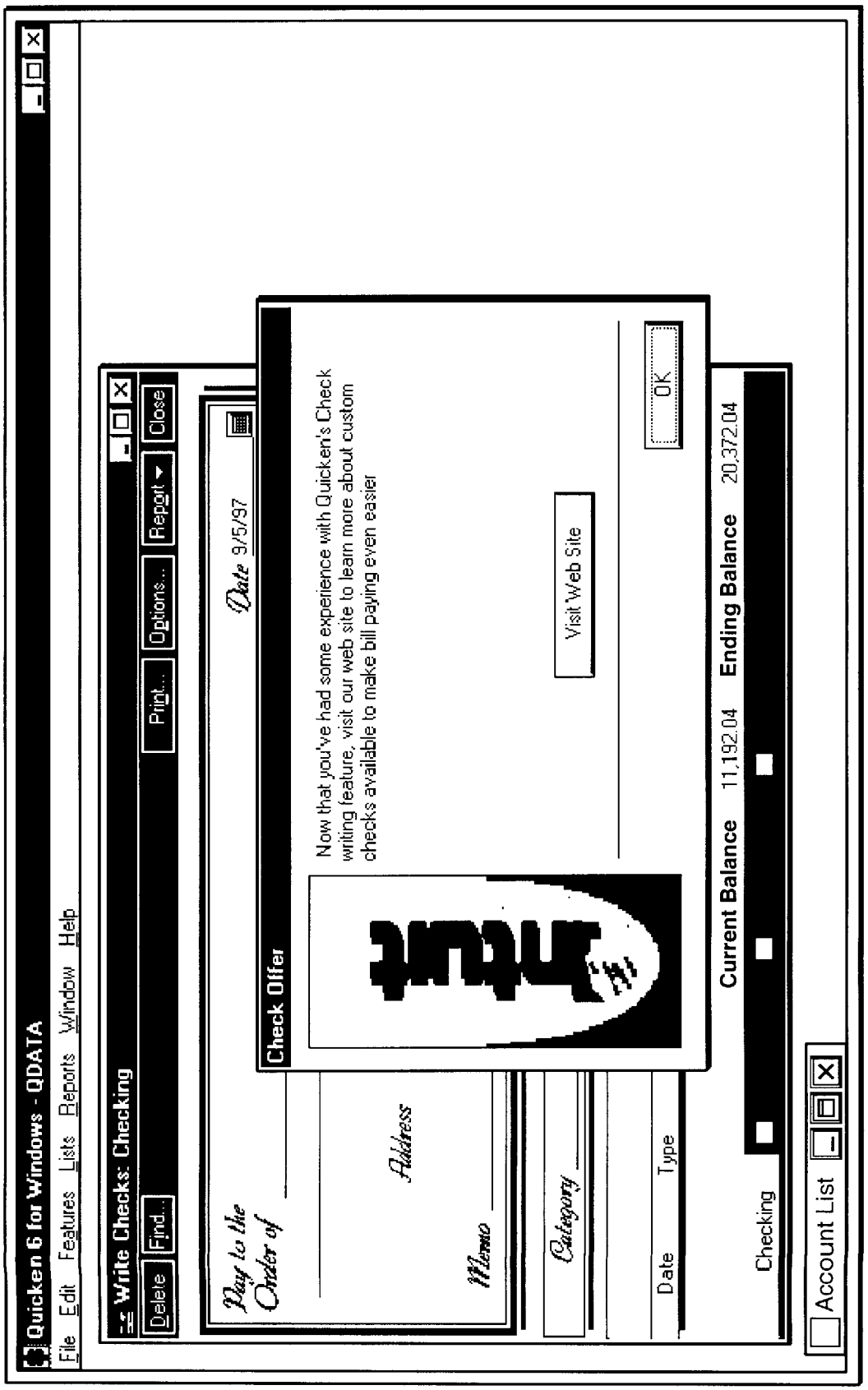
FIG._5

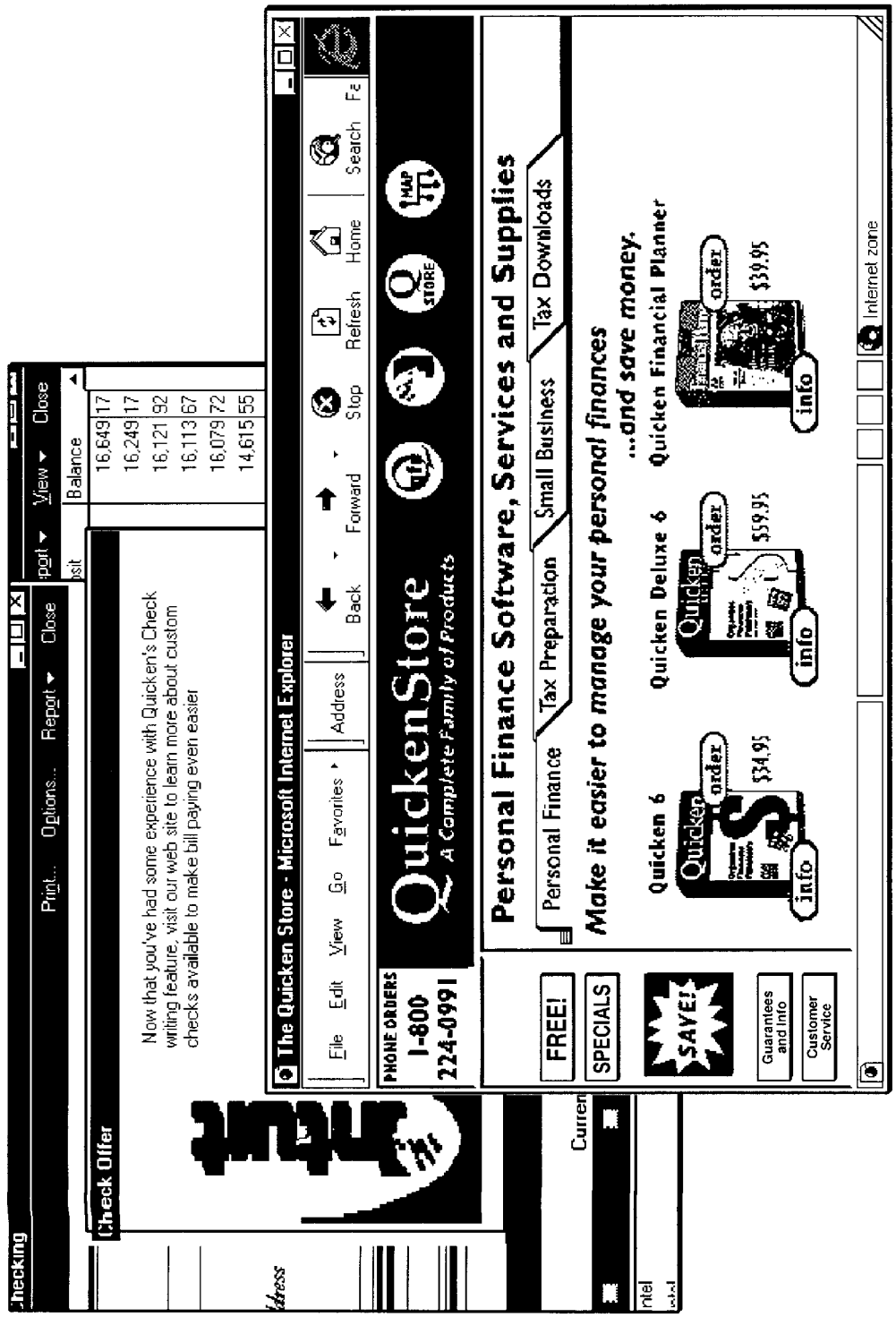
FIG._6

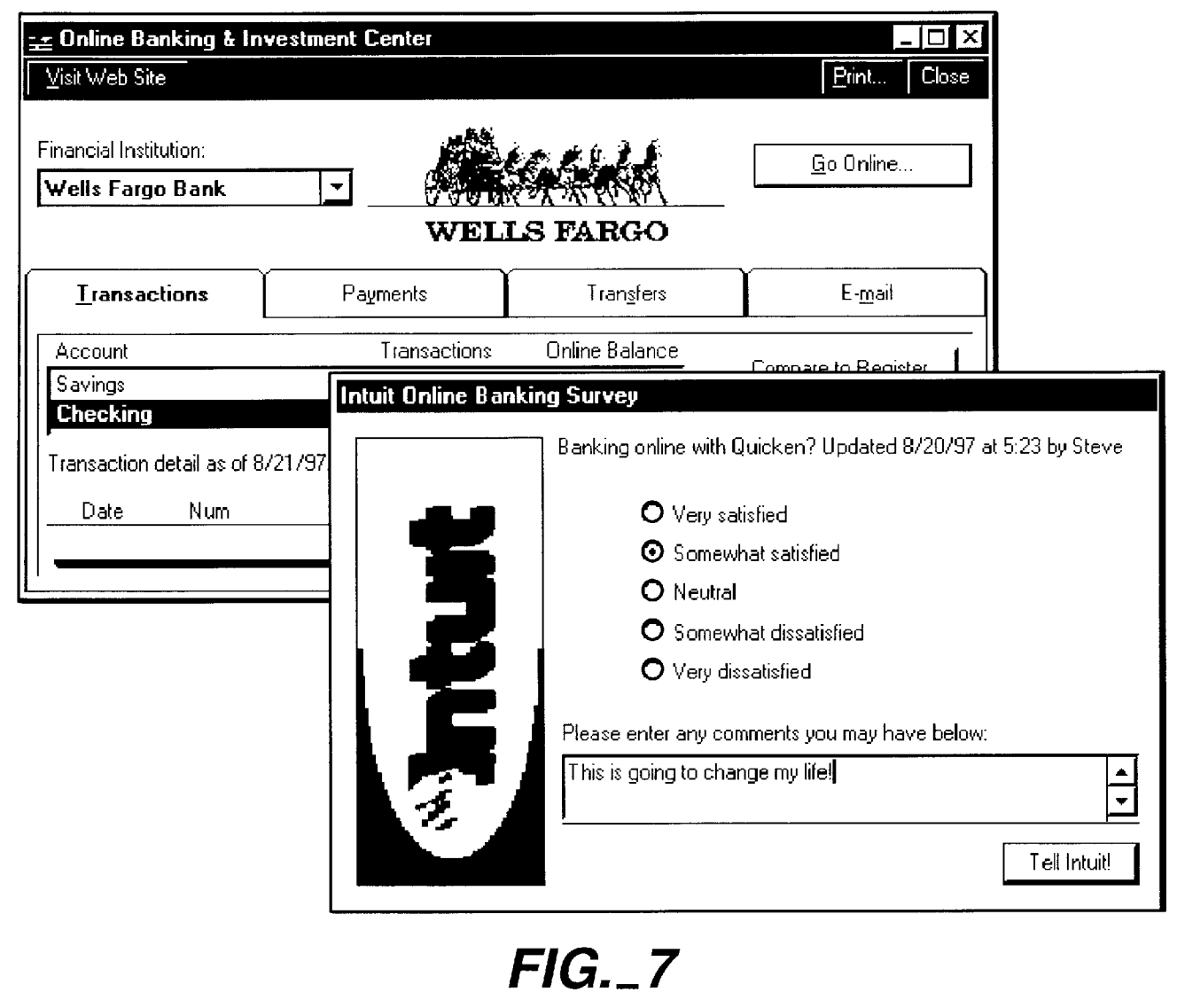

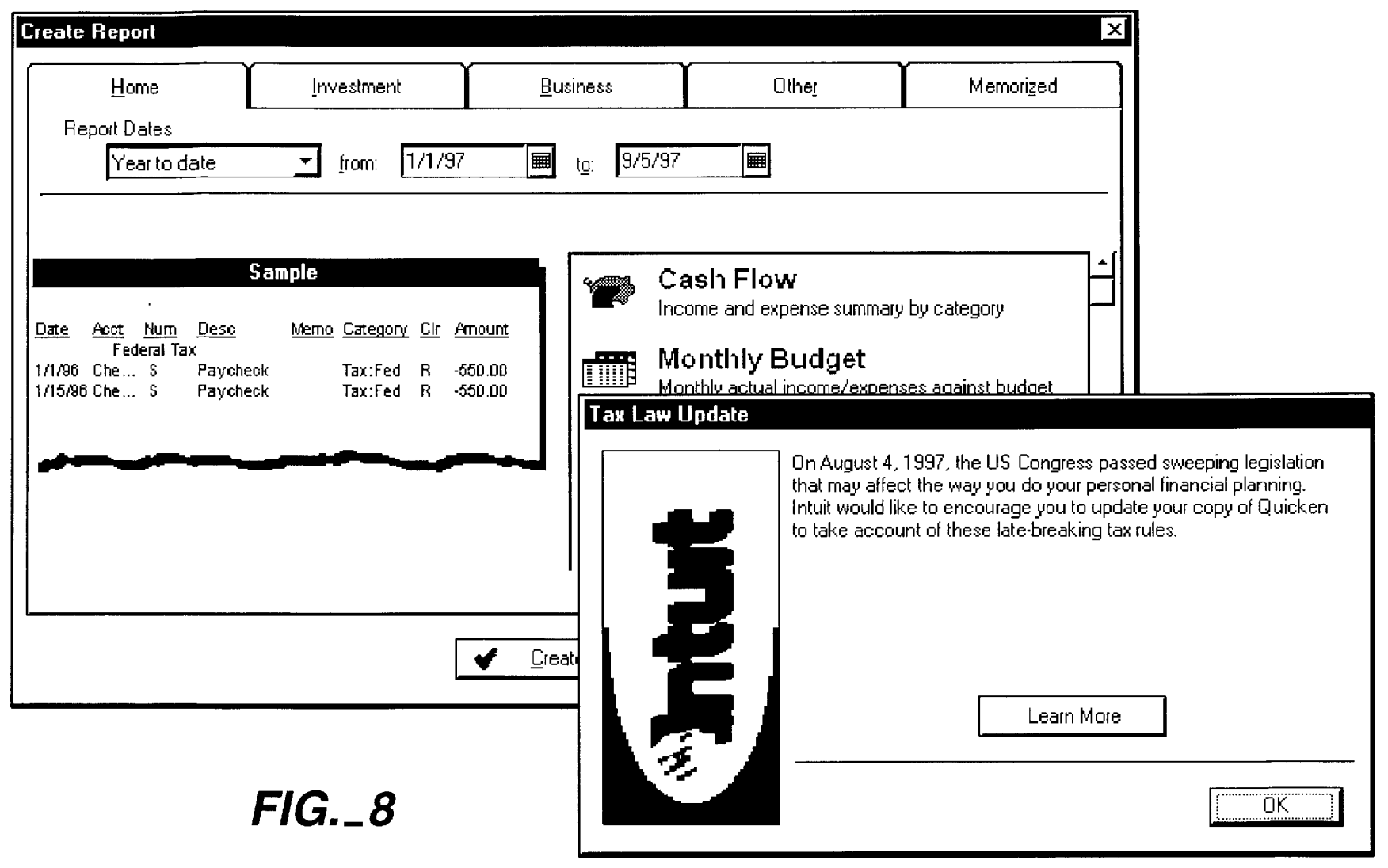

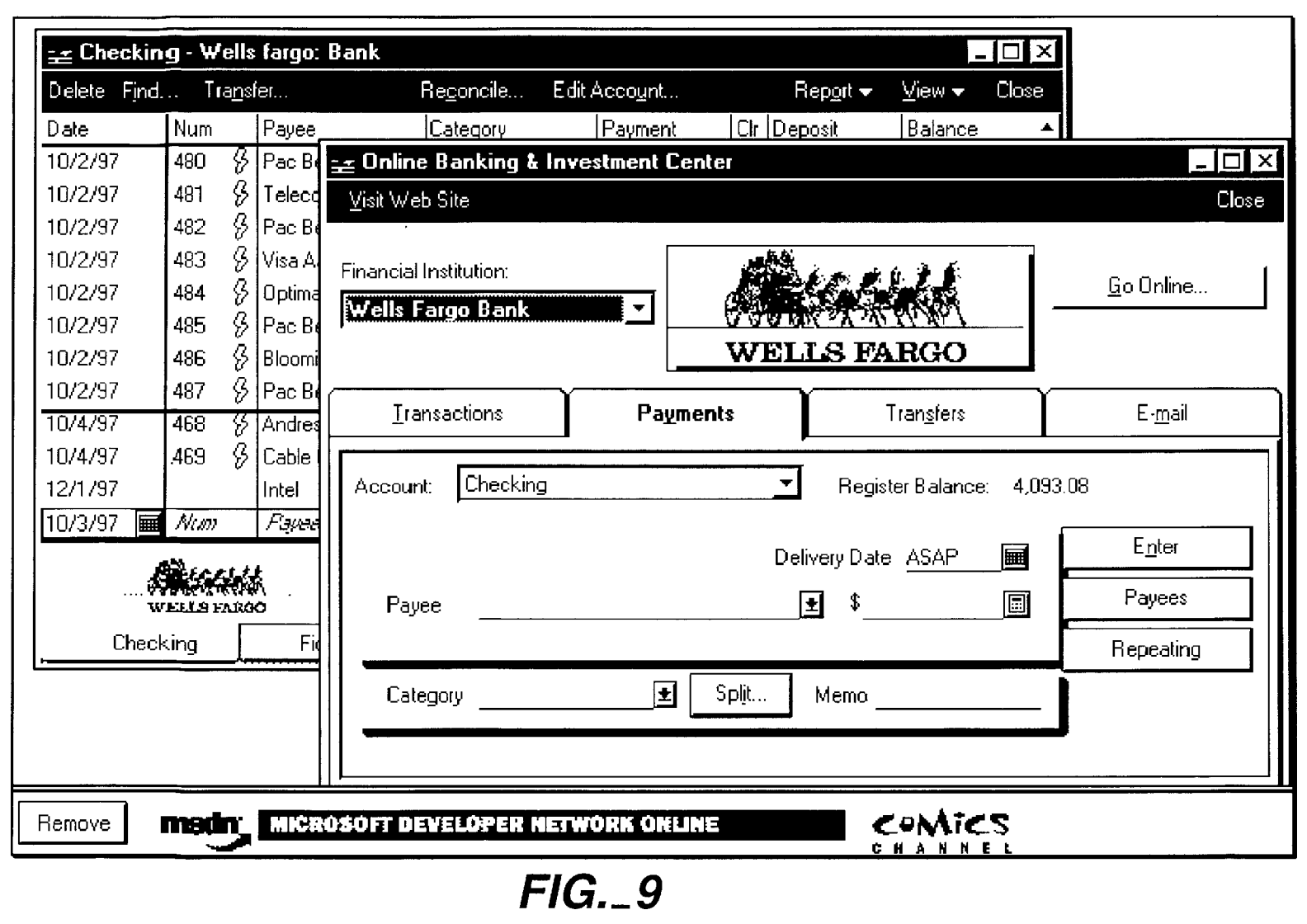

INTERACTIVE CUSTOMER SUPPORT FOR COMPUTER PROGRAMS USING NETWORK CONNECTION OF USER MACHINE

BACKGROUND OF THE INVENTION

1. Field of the Invention

The present invention relates to customer support for computer programs.

2. State of the Art

Customer support is service that computer and software manufacturers (as well as third-party service companies) offer to customers. In the case of an Independent Software Vendor (ISV), customer support may include a phone number for customer to call for advice and trouble-shooting, a bulletin-board system staffed by service engineers, or a forum within an on-line service. Software updates may be downloaded that correct known bugs. Internet-based customer support, problem resolution and call tracking has been recently introduced.

Customer support may be mutually beneficial to both the customer and an ISV. Customer support enables the customer to get the most out of a software product. At the same time, customer support fosters a relationship between an ISV and a customer and provides "up-sale" opportunities for the ISV.

In the past, however, customer support has been initiated by the customer on a hit-or-miss basis. Ironically, when things go most smoothly for the customer, indicating a job well-done on the part of the ISV, the customer is least likely to initiate a customer support relationship, and up-sale opportunities are most likely to be missed. Furthermore, customer support has traditionally been human-intensive. Getting through to a service engineer may be difficult enough in itself, but then the customer must spend a significant amount of time acquainting the service engineer with the customer's individual needs and circumstances. A small "dose" of support is then given. The next occasion for interaction is likely to be much the same. No opportunity exists for broad-based, systematic, individualized customer support.

U.S. Pat. No. 5,406,269 describes a customer intelligence system in which surreptitious telephone reporting calls are made by modem from remote equipment to one or more monitoring sites. Various uses for information gathered in this manner are proposed, including determining those customers who are ready for upgrades, showing potential customers usage statistics pertaining to the installed base, etc. Communications is one-way, in the uplink direction only. Furthermore, surreptitiousness greatly restricts the manner in which the system may be used and raises many issues of privacy and intrusiveness.

SUMMARY OF THE INVENTION

The present invention, generally speaking, provides for broad-based, systematic, individualized, interactive customer software support through a two-way, voluntary automated exchange of information between a software agent installed on a customer's machine and a server machine via a wide area computer network, e.g., the Internet. Communication between the agent and the server is optimized to be unobtrusive or transparent, using spare bandwidth of intermittent Internet connections, for example. The agent is software non-specific and may be instructed to operate with respect to any arbitrary software program, and may further be instructed at various different times to operate with respect to various different software programs, including multiple different software programs on a single machine. The agent, with the user's informed consent, gathers activity information about the operations of the software program(s) and uploads this information to a particular server machine within a distributed server machine architecture, where it is stored in a database on a per-software-copy basis. A rules engine may cause instructions carrying a message targeted specifically toward the customer (based on the activity information) to be downloaded to the agent. Based on these instructions, the agent may take any of various actions, such as present a survey, present an advertisement, send an upgrade notice, present a limited-time offer, deliver individualized marketing messages, offer goods for sale and fulfill the commercial transaction, install an upgrade or bug fix for either an application or the agent itself, etc. Message presentation to the customer may be timed (e.g., delayed from the time of download) to achieve maximum impact. Timing may be relative to individual program menu selections. For example, a message relating to a particular product feature may be presented just after that feature has been used. The agent may be instructed to operate with additional applications, including applications shipped prior to the existence of the agent. Exemplary uses include marketing, sales, customer registration, technical support, market research, customer surveys, usage monitoring, software testing, in-product advertising, etc.

BRIEF DESCRIPTION OF THE DRAWING

The present invention may be further understood from the following description in conjunction with the appended drawing. In the drawing:

FIG. 1 is a generalized block diagram of the present system;

FIG. 2 is an illustration of a preferred customer enrollment screen display;

FIG. 3 is a more detailed block diagram of the agent of FIG. 1;

FIG. 4 is a diagram illustrating a distributed server architecture that may be used in the system;

FIG. 5 is an illustration of a screen display in which the time and place of message delivery is controlled;

FIG. 6 is an illustration of a screen display resulting from the user clicking through during display of the screen display of FIG. 5;

FIG. 7 is an illustration of a screen display in which the message is a survey;

FIG. 8 is an illustration of a screen display in which the message relates to a software update; and FIG. 9 is an illustration of a screen display in which the message is a banner advertisement.

DETAILED DESCRIPTION OF THE PREFERRED EMBODIMENTS

Referring now to FIG. 1, the general architecture of the present system will be described. A user machine is assumed to include a run-time environment, provided by an operating system, a Web browser or the like, and to be running one or more computer programs. The computer programs may be software applications, system software or embedded computer programs. Systematic, individualized, interactive customer software support is made possible by equipping the user machine with a persistent client, or agent, that engages in two-way communication with a server. The agent may be installed concurrently with an application, may be preloaded on the user's machine, may be separately installed from a disk or download, etc. The connection between the agent and the server is a virtual connection, i.e., a connection that time-shares a physical communications channel with other communications. In an exemplary embodiment, the virtual connection uses spare bandwidth of intermittent Internet connections to communicate with the server. The agent can and typically does interact with the application without a concurrent Internet connection.

Communications between the agent and the server are voluntary. In an exemplary embodiment, when the agent is first activated on behalf of a particular application, it displays to the user a preferred customer enrollment screen display such as that of FIG. 2. By clicking on the appropriate button, the user may accept or decline to participate in the preferred customer program. If the customer accepts, then the customer enters into an invited relationship with the software vendor and agrees to the software vendor maintaining personalized information about the configuration and use of the application in order to provide individualized service.

Communications between the agent and the server are also two-way. In the uplink direction, the agent communicates control, configuration and usage information, registration information, survey information, etc. In the downlink direction, the server communicates non-executable content, executable content, or both, including control information, agent updates, etc. Separate servers may be responsible for delivering non-executable content and executable content, as described more fully hereinafter. Non-executable content may include tips, offers, advertisements, surveys, etc. Note that non-executable content may nevertheless be active, i.e., contain HTTP links enabling the user to "click through" to related Web sites. Executable content may relate to the application or to the agent or both. Executable content related to the application may include updates, bug fixes, additional code modules, etc. Executable content related to the agent allows the agent to be transparently upgraded with new capabilities in the field, avoiding the potential problem of agent obsolescence.

Referring to FIG. 3, a detailed block diagram of the agent is shown.

In an exemplary embodiment, the agent follows a plug-in architecture. The agent process therefore includes a resident agent and various plug-ins that interface to the resident agent through a plug-in API. In an exemplary embodiment, the plug-ins include a command processor plug-in, a message plug-in, a survey plug-in, an Inet plug-in that handles virtual connections to the Internet, and a hook plug-in. The message plug-in, survey plug-in, and possibly other plug-ins are capable of taking actions within the process and User Interface (UI) space of the client applications. Other plug-ins may be included with the agent or added to the agent by download. If a plug-in needs the assistance of another plug-in, the agent will pass parameters transparently to the target plug-in. Persistent storage is provided for the plug-ins as well as for the resident agent, e.g., within the registry file system.

The modularity resulting from plug-in architecture of the agent is important from the standpoint of allowing for user-transparent operation. The core agent and the plug-ins are all small modules that are easily downloadable. The time needed to download a module is typically only a few seconds.

Core tasks of the agent include the following:

1. Manage plug-ins and inter-plug-in communication.
2. Download content (command files) and determine an appropriate command interpreter for handling the command files. Retrieve the command interpreter plug-in from the server and invoke it with the downloaded command file.
3. Maintain state (e.g., the current command file) to survive system crashes and restarts. The operating system registry may be used for persistent storage of state information including the configurations of the plug-ins, the status of events and the registered client applications.
4. Monitor the system Internet connection and schedule uploads and downloads.
5. Track target applications and determine their usage. From this information and the command file data, schedule actions to be taken in the target applications user interface (UI) space through the plug-in interface.
6. Change its level and type of activity, including becoming inactive in response to a server.

The agent is capable of interacting with software applications in all respects without modification of the application itself. In particular, a small system hook (e.g., a DLL) is inserted into the windows message processing loop. Using data provided by the agent, the system hook determines if any relevant actions are happening within a monitored application and if so, passes this information off asynchronously to the hook plug-in. The system hook is designed to not degrade the user's system performance or application performance. More particularly, in an exemplary embodiment, the agent when it first launches loads the hook plug-in, which starts execution of a separate thread. This thread interacts with the system hook and is responsible for selecting messages of interest. The separate thread ensures that processing of the messages of the client application are not noticeably slowed down. Note that, to prevent recursion in the message processing, the system hook ignores any messages related to the agent itself.

The Inet plug-in is responsible for handling all Internet traffic. In an exemplary embodiment, it supports various types of Internet transactions, including registering an agent with the server and obtaining a user ID, retrieving a command file using the user ID, uploading data to the server, and downloading resources from the server. Data may be exchanged using POST and GET commands, for example, as in the HTTP1.1 protocol. The Inet plug-in is designed to gracefully fail if any transaction is not completed across the Internet.

The command processor plug-in is responsible for converting the command file into tangible actions. For example, it scans the command file and schedules all resource downloads required by the command file, expands any macros, and generates a clean version of the command file. It then processes the command file, merges it with existing command files, removes all completed events from the command file, and schedules all events and actions to be taken by the agent. Finally, it marks the command file as active in persistent storage and uploads a command line status update that allows the server to track the execution of events in the client application.

An agent control panel applet enables user interaction with the agent to control prospective operation of the agent, although typically the user will not have occasion to use the control panel. As described previously, the user may accept or decline the invitation to become a preferred customer. The user may be provided with additional control beyond this initial decision. For example, the user may choose at a later time to modify the degree of interaction, the type or amount of information transmitted, or withdraw entirely from the preferred customer program and discontinue all communications between the agent and the server. The user may wish instead to continue uplink operations (e.g., monitoring by the agent to facilitate conventional kinds of customer service) but to discontinue downlink operations. Alternatively, the user may wish to continue uplink operations and a limited subset of downlink operations, e.g., upgrade notification. Various other options may be provided.

In an exemplary embodiment, the resident agent includes a scheduler/manager, a remote dialup monitor, and a command file pre-processor. The resident agent also includes a client map, an event map and a plug-in map. The resident agent is responsible for dynamically maintaining the configuration and status of active plug-ins, the registered client applications and the events working on the client applications. A command queue contains actual event information and is processed upon each agent start. In an exemplary embodiment, the agent is started by a machine start table within the registry of the operating system.

The scheduler/manager is responsible for establishing periodic Internet connections with the server, through the Inet plug-in. If a connection becomes available, each client object is allowed bandwidth to service the client's needs. Subsequently, all pending POST operations are processed. The scheduler/manager can be invoked either via an event driven method, in the case of dialup Internet access, or at periodic intervals in the case of direct (or proxied) LAN-based Internet access. In the case of dialup access, different dialup access methods may be used depending on the software configuration of the user machine. The remote dialup monitor determines which dialup access method is used and establishment of an Internet connection is detected accordingly.

The client map, event map and plug-in map together operate to establish "client channels" though which interaction between the clients and the server occurs. The client map consists of one or more client objects. At a minimum, a privileged client object is present that is allowed to add clients to and remove agents from the client map and to add agents to and remove agents from the plug-in map. All other client channels can only be used to schedule events and direct the agent to download content from a server. A client object within the client map has a corresponding event object within the event map and a corresponding plug-in object within the plug-in map. The event map in combination with the client map causes user interactions in the client applications UI space.

Note that preferred support for copies of applications already in the field can be added simply by causing the agent to download client objects for those applications. A client object (or "affinity module") contains information that allows the system hook to recognize events from a particular application.

The agent checks in with the server when a check-in interval for the application has elapsed. The agent may receive back a command file from the server, which the agent then interprets. The interpretation of the command file may cause the agent to fetch resources from the server and/or place information back onto it. The agent may also be instructed to check-in for another command file. The privileged client is also considered an application for the agent. Therefore the agent checks in with the appropriate server on a check-in interval separate from the check-in intervals of other applications. Also, an application's command file may cause the privileged client to check in, or vice versa.

When the agent has acquired the resources and commands from the server to actually do some work, it can be instructed to immediately display appropriate messages to the user, or (more commonly) to wait until the target application is running, and work in the context of the application. The agent converts system event data into tangible actions events for the attached plug-ins, with messages appearing to the user as coming from the vendor, within the application's screen window and only while the application is running. There results a sense of connectedness and trust between the customer and the vendor. A typical sequence of events is as follows:

1. The system hook determines that a new application has launched or gotten the user's focus.
2. The agent queries its client objects to see if the application is a client. If it is not a client, the agent remains dormant.
3. A valid client with user input will cause the agent to instruct the system hook to start detailed monitoring of the application and route selected application messages through the hook plug-in.
4. The hook plug-in will reflect the message asynchronously to the agent, which will catalog the events under the current user's name.
5. The agent queries its client event map to look for a match.
6. If a match exists, the event is executed, which could include invoking a plug-in to undertake action in the application's UI space. If visible content is shown in the application's UI space, the client application is temporarily disabled and cannot receive user focus.
7. If any uploadable content is generated during this event, it is passed to the Inet plug-in, which will either send it or schedule it to be sent the next time bandwidth is available.
8. After completion of the event, the user focus is set back to the client application.
9. The agent returns to Step 4 above until the client application loses focus. When the client application loses focus, the agent transfers any client application-related data to persistent storage, at which point the agent reverts to Step 1 above.

Having described the structure and function of the agent, the server will now be described.

The essential job of the server is the delivery of an appropriate command file to particular agent. The command files in the agent determine the action that the agent is going to take—which of the various kinds of activities it will carry out, at what time, with respect to what user operation, etc. The server maintains a record for every single user of an application. When the agent working for one of its user's connects to the server, it consults a table of rules that determines which, if any, of the potential command files that the server has for that application are appropriate for that agent. Those rules are predicates that are based on all the data in the database relative to that user.

An example of a rule might be "If installation of this application took place 60 or more days ago, send Command File A," which causes the agent to perform some action, "and if installation took place less than 60 days ago, send Command File B," which takes some other action. The two actions would differ with respect to the degree of experience that particular user has with the program. For example, in the case where an upgrade has become available, a publisher may choose to send one upgrade message to experienced users, more appropriate to their experience level, and another upgrade message to less experienced users, more appropriate to their experience level. The determination of experience level may be based, for example, on the time elapsed since installation.

The server applies rules that have been created in a table sequentially to determine which if any of those rules are true for a particular agent that is querying the server at a particular point in time. Upon discovering that one or more of those rules "fires," i.e. is true, then the corresponding one or more command files are downloaded to the agent. The publisher therefore enjoys very "fine-grain" control of the activities of an agent based on the attributes of that agent. Very sharp targeting results in which particular information is sent to particular agent based its characteristics and its history.

As may be appreciated from the foregoing description, the server has two different types of responsibilities. One function of the server is to maintain the agent. Operations to maintain the agent occur through the control channel described previously. Another function of the server is to provide customer support for specific client applications. These two distinct functions can be combined on one physical server machine or on multiple physical server machines. More preferably, these two functions are separated, with agent maintenance being handled by a technology provider server and customer support being handled by a collection of software vendor servers. In general, executable content is provided from the technology provider server across the control channel and non-executable content is exchanged with software vendor servers across other channels as shown in FIG. 4. In this manner, executable content may be assured to be virus-free. Also, private vendor-customer information may be passed directly to the vendor without being passed through a third party. For tracing and billing purposes, the privileged client periodically connects to the technology provider server and informs it of activities of the agent on behalf of various client applications.

Identifiers are allocated to support the foregoing separation of functions. In particular, the agent when it is first activated seeks a connection opportunity and, when a connection is established, obtains an agent ID from the technology provider server through the control channel. At the same time or at a later time, the agent receives from the server a command file instructing the agent to look for a particular application. If that application is found installed on the user's system, a client ID is obtained for that copy of the application. Only the technology provider server need be aware of the correspondence between agent IDs and client IDs. Transactions between the agent and the vendor server use only the client ID.

At a vendor server, a Relational Database Management System (RDBMS) maintains a per-client-copy database of information uploaded from various instances of an application. In an exemplary embodiment, the agent collects numerical counts for each menu bar item in a client application. The vendor may determine from the database how often the file:print command has been used, for example. The RDBMS includes a rules engine. Business rules are established governing the actions to be taken in relation to a particular copy of the application depending upon the data stored for that application. When action is to be taken, a command file is prepared and transferred to the agent.

Note that the system has the ability to precisely target the moment a message dialog appears in a client application. The vendor can pick an operation from among a menu hierarchy of the application, a time delay, and a number of times to repeat the operation until it is completed with a click-through or other affirmative response. The system also has the ability to determine who among the vendors installed base will see a particular message. Criteria can be based on demographics, responses to past offers, responses to past surveys, usage information, time since the application was installed, even random selection. Any information in the database can be used to determine who gets a particular message.

The following examples illustrate possible actions of the server triggered based on data stored within the database:

1. Send all users a message before or after use of a particular feature after that feature has been used a specified number of times (FIG. 5). The message may include an HTTP link, allowing for click-through (FIG. 6).
2. Present a survey to all users after a specified time has passed or a specified level of usage has been achieved (FIG. 7).
3. Present an update message to all users at next use of the application or a particular feature of the application (FIG. 8).
4. Present a banner ad to each user upon application start up, with the banner ad being chosen based on an ad presentation history for that user (FIG. 9).

Preferably, a Web-based administration tool is provided to allow business rules to be set up and changed through a familiar Web-form interface. Using the Web-form interface, the vendor can, for example, define a survey, to whom the survey should be presented, and how it is to be timed within the vendor's application. After a survey is initiated, the vendor can go to a Web site and view the progress of the survey, including the responses in real time as they come in.

The following Appendix shows a sample command file. It runs a plug-in (pi1) during the vendor's application and returns the result tot he server. Once this is done, it does a check-in so that the server can send follow-up commands. It also retrieves some usage information from the registry immediately.

APPENDIX

Here is a sample command file. It runs a plugin (pi1) during the vendor's app and returns the result to the server. Once this is done, it does a check-in so that the server can send follow-up commands. It also retrieves some usage information from the registry immediately:
[ci]http://fullcircle-sys.com/ci1.fcp[flags]"-p"
[eventmanager]http://fullcircle-sys.com/acem.fcp
[define]plugname[=]http://fullcircle-sys.com/ad/pi1.fcp
[define]plugi[=]http://fullcircle-sys.com/ad/pi1i?UID,$TID
[define]plugo[=]http://fullcircle-sys.com/ad/pi1o?$UID,$TID
[define]soon[=]31-Dec-1997
[transid]12345
[cobegin]
[get]$plugname
[get]$plugi-
[coend]
[wait]app_running // Really should be on line with plugin command
[plugin]$plugname[command]1[input]$plugi[output]plugo[expires]soon
[post]plugo
[delete]plugo
[pause]15
[checkin]
[define]usage[=]http://fullcircle-sys.com/ad/usage1?$UID,$TID
[transid]9876

APPENDIX-continued

```
[copy]$usage[=]reg://some.path.in.the.registry
[post]$usage
        Here is another sample command file:
                          t10040001.fcc
[ci]http://fc1.previewsoft.com/resources/fccmd32.fcp[Function]
80000[Version]0102[UnLoad]1[Name]fccommand01[command]1[flags]-p
// Last Updated 11/10/97 by SG
[eventmanager]http://fc1.previewsoft.com/acem.fcp
// D E F I N E S
//
[define]p6[=]http://fc1.previewsoft.com/resources/fcsurvey32.fcp[Functi
on]60000[Version]0105[UnLoad]1[Name]FCMultipleDialogPlugin
[define]plugi[=]http://fc1.previewsoft.com/resources/INTUIT_
LOGO.BMP
// trigger on backup to offer customer a zip drive
[define]qziq[=]http://fc1.previewsoft.com/resources/q_zip.fcr
//
[define]plugo[=]http://fc1.previewsoft.com/scripts/fullcircle_scripts/f
c_return_data01.idc?#UID&#TID
[define]soon[=]31-Dec-1997
[define]usage[=]http://fc1.previewsoft.com/scripts/fullcircle_scripts/f
c_return_data01.idc?#UID&#TID
// T R A N S A C T I O N S
//
[transid]10040001
[cobegin]
[get]$p6
[get]$plugi
[get]$qzip
[coend]
// use backup menu to offer a promotion with Iomega for a zip drive
[wait]app_running[menucmd]7010[delay]0[skip]0[run]9[plugin]$p6
[command]1[input]$qzip[output]$plugo[expires]$soon
//
```

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A method of providing individualized, interactive customer support wherein a user machine is at least intermittently connected to a wide area computer network and receives content over the wide area computer network, the method comprising the steps of:

assigning a software agent to monitor a selected computer program, wherein the software agent is separate and independent from the selected computer program;

the agent identifying a computer program running on the user machine as the selected computer program;

the agent monitoring operation of the computer program, including user inputs to the computer program;

transparent to the user, the agent communicating monitored information through the wide area computer network to a remote server; and at runtime, the agent receiving from the server content affecting operation of the computer program.

2. The method of claim 1, comprising the further step of presenting content received from the server within a user interface space of the computer program.

3. The method of claim 2, wherein the content is presented in timed relation to a monitored event.

4. The method of claim 1, comprising the further step of presenting the user with an option to accept or decline the customer support, and inputting a response of the user.

5. The method of claim 1, wherein monitoring comprises gathering usage data with respect to the computer program.

6. The method of claim 5, wherein the usage data includes numerical counts for each of multiple menu bar items.

7. The method of claim 5, comprising the further steps of:

the server accumulating usage data for each of multiple computer programs; and the server determining content to be received for a particular computer program based on accumulated usage data for that computer program.

8. The method of claim 7, wherein the server performs steps comprising for each of multiple copies of a computer program:

receiving an identifier identifying a copy of a computer program; and receiving and storing in a database information concerning usage of that copy of the computer program.

9. The method of claim 8, wherein the server performs steps comprising:

receiving an identifier identifying a copy of a computer program;

evaluating each of multiple rules stored in a database to determine which rules are applicable to that copy of the computer program; and sending to an agent for that copy of the computer program a corresponding command for each rule determined to be applicable to that copy of the computer program.

10. The method of claim 7, comprising the further step of using a Web-based administration tool to set up rules determining what content is to be received by what computer program based on accumulated usage date.

11. The method of claim 7, wherein the content is non-executable content.

12. The method of claim 11, wherein the non-executable content is active content containing at least one hypertext link.

13. The method of claim 11, wherein the non-executable content is one of the following: an advertisement, a promotional offer, a survey, and a program usage hint.

14. The method of claim 7, wherein the content is executable content.

15. The method of claim 14, wherein the executable content is one of the following: a bug fix, an agent plug-in, a replacement agent, and a module or plug-in for the computer program.

16. The method of claim 1, wherein communicating comprises detecting a connection to the wide area computer network and using a small fractional portion of bandwidth available to the connection.

17. The method of claim 1, wherein the monitoring, communicating and receiving steps are performed by an agent running on the user machine.

18. The method of claim 17, wherein the computer program and the agent communicate only indirectly through messaging facilities of a run-time environment of the computer program.

19. The method of claim 18, comprising the further steps of storing state information for the agent within persistent storage.

20. The method of claim 19, wherein an operating system registry is used for persistent storage.

21. The method of claim 18, wherein the agent operates in behalf of multiple distinct and separate computer programs.

22. The method of claim 18, wherein the agent comprises a privileged client object and at least one other client object, wherein communicating comprises the privileged client object communicating with a first server across a control channel.

23. The method of claim 22, wherein communicating comprises the other client object communicating with a second server across a channel other than said control channel.

24. A system for providing individualized, interactive customer support wherein a user machine is at least intermittently connected to a wide area computer network and receives content over the wide area computer network, comprising:

a server connected to the wide area computer network; and an agent running on the user machine, comprising:
 means for assigning the agent to monitor a selected computer program;
 means for identifying a computer program running on the user machine as the selected computer program;
 means for monitoring operation of a computer program running on the user machine, including user inputs to the computer program;
 means for, transparent to the user, communicating monitored information through the wide area computer network to a remote server; and
 means, ar runtime, receiving from the server content affecting operation of the computer program;
wherein the agent is separate and independent from the selected computer program.

25. The apparatus of claim 24, further comprising means for storing in persistent storage state information for the agent.

26. The apparatus of claim 24, wherein said means for monitoring comprises an operating system hook.

27. The apparatus of claim 24, wherein the agent follows a plug-in architecture.

28. The apparatus of claim 27, wherein the wide area computer network is the Internet, and a required plug-in of the agent is an Internet plug-in for handling Internet traffic between the agent and the server.

29. The apparatus of claim 24, wherein the agent comprises a plurality of code modules each of a size such that an average download time of a code module is only a few seconds.

30. The apparatus of claim 29, wherein the agent comprises a plurality of the following modules: an agent core module, a command processing module, a message module, a survey module, an Inet module, and a hook module.

* * * * *